United States Patent
Kühnhold et al.

(10) Patent No.: US 6,350,205 B1
(45) Date of Patent: Feb. 26, 2002

(54) MONOBLOC HOLLOW SHAFT

(75) Inventors: Wolfgang Kühnhold, Neu-Isenburg; Rudolf Beier, Offenbach/Main, both of (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/599,140

(22) Filed: Jun. 22, 2000

(30) Foreign Application Priority Data

Jun. 25, 1999 (DE) .......................................... 199 29 159

(51) Int. Cl.[7] ................................................. F16C 3/00
(52) U.S. Cl. ........................ 464/183; 464/179; 138/177
(58) Field of Search ........................... 138/177; 464/183, 464/179

(56) References Cited

U.S. PATENT DOCUMENTS

| | | | | |
|---|---|---|---|---|
| 4,392,839 A | * | 7/1983 | Aucktor | 464/183 |
| 4,834,693 A | * | 5/1989 | Profant et al. | 464/183 |
| 5,243,880 A | * | 9/1993 | Beier et al. | 464/183 |
| 5,287,768 A | * | 2/1994 | Amborn et al. | 464/183 |
| 5,346,432 A | * | 9/1994 | Greulich et al. | 464/183 |

FOREIGN PATENT DOCUMENTS

| | | | |
|---|---|---|---|
| BR | 1 358 558 | 7/1974 | |
| DE | 2 135 909 | 1/1973 | |
| JP | 64-12116 | * 1/1989 | 464/183 |

* cited by examiner

Primary Examiner—Lynne H. Browne
Assistant Examiner—Aaron M Dunwoody

(57) ABSTRACT

A monobloc hollow shaft for transmitting torque, having two end portions, which, at their axial outer ends, are provided with shaft toothings for introducing torque, and having a central portion which, as compared to the end portions, has a smaller wall thickness, wherein, when torque is introduced via the shaft toothings, due to torsional forces a central part of the central portion of at least 25% of the length of the shaft is first of all uniformly plastically deformed.

6 Claims, 3 Drawing Sheets

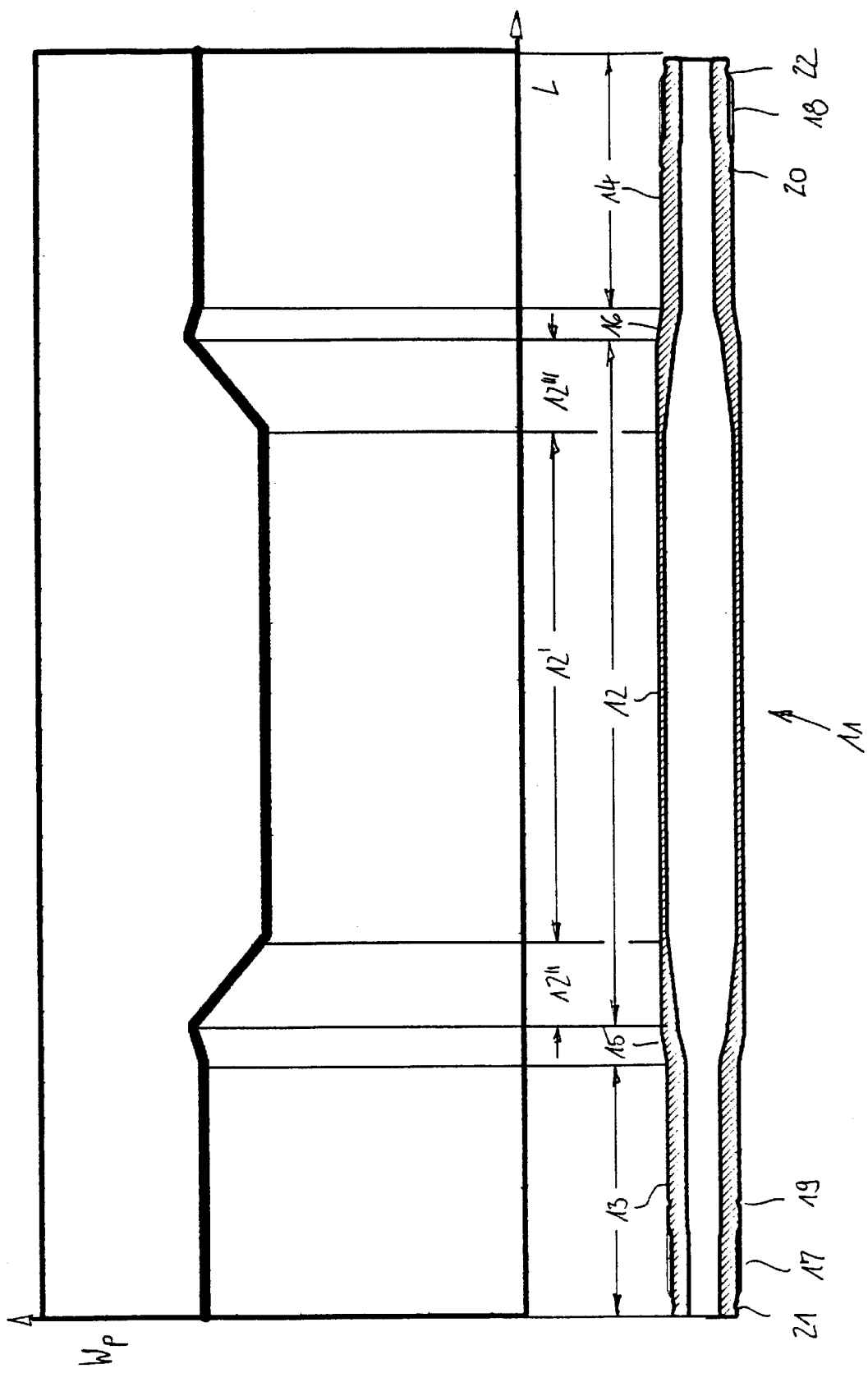

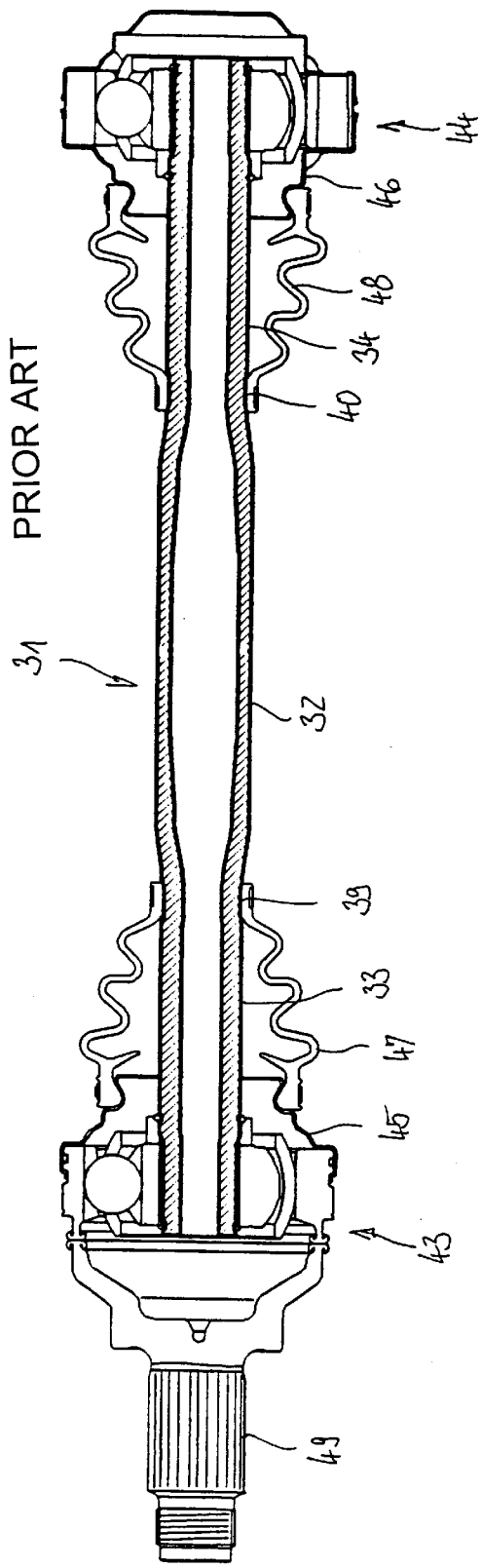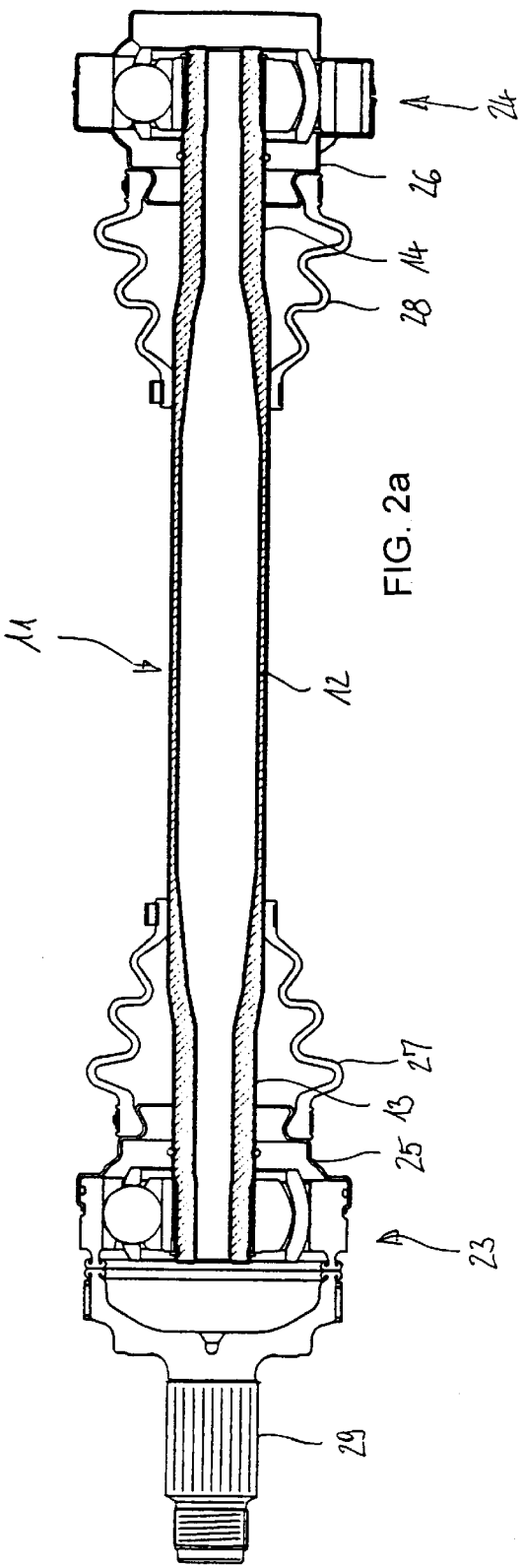

MONOBLOC HOLLOW SHAFT

BACKGROUND OF THE INVENTION

The invention relates to a monobloc hollow shaft for transmitting torque, having two end portions which, at their axial outer ends, comprise shaft toothings for introducing torque, and having a central portion which, as compared to the end portions, has a smaller wall thickness. Such shafts, as so-called intermediate shafts, are completed by being provided with two constant velocity universal joints which are slid onto the shaft toothings, and with convoluted boots which seal the universal joints relative to the shaft, such shafts thus turned into side driveshafts.

Monobloc hollow shafts are nowadays normally designed in such a way that they have as constant a polar resistance moment ($W_p$) as possible across the entire cross-section. The objective is to achieve as low a weight as possible. This was first described in DE 30 09 277 C2.

In DE 21 35 909 A1, it is proposed to provide the rotational resistance moment for a monobloc hollow shaft in the region of the central tube portion in a ratio of 1:3.4 to 1:4.4 lower than in the joint receiving regions. The purpose of this measure is to provide a particularly lightweight shaft.

Nowadays, when a vehicle is starting, such shafts are often subjected to loads beyond the elastic range, with the risk of fracture being immanent. To increase the strength of the shaft, it is common practice to case-harden the monobloc hollow shafts to achieve smaller wall thicknesses with sufficient strength values. It is a well-known fact that case-hardening leads to a relatively brittle fracture behavior with small fracture angles.

The convoluted boots which seal the universal joints relative to the intermediate shaft are, as a rule, fixed on a relatively small diameter in grooves in the intermediate shaft, the disadvantage being that this results in areas of cross-sectional weakness in which, substantially, plastic deformation occurs in the case of load peaks. Such deformation leads to a reduction in the operating ability of the shaft, which, when new load peaks occur, directly results in fracture.

SUMMARY OF THE INVENTION

It is, therefore, an object of the present invention to provide a monobloc hollow shaft which is able to withstand repeated load peaks without being subjected to the risk of early fracture. The objective is achieved in that, when torque is introduced via the shaft toothings, due to torsional forces, a central part of the central portion of at least 25% of the length of the shaft is first of all uniformly plastically torsionally deformed.

From DE 40 10 900 C2 there are known hollow shafts wherein the polar resistance moment is not constant along the length of the shaft. But in this case, it is only along half of the shaft length that a relative minimum of the polar resistance moment is provided which, because of the larger diameter, will approximately amount to at least the minimum resistance moment of the shaft ends. Further, in the case of excessive loads, the location of said minimum as well as the above-mentioned grooves will form the location of plastic deformation. This leads to the same disadvantages as mentioned above, i.e., a reduction in the operating ability, which, in turn, will lead to early fracture if new loads occur.

On the other hand, if, in a shaft in accordance with the present invention, the torsional elasticity limit is exceeded, the entire central part of the central portion with a low resistance moment will begin to flow uniformly. As a result, the shaft will not fracture until a large torsional deflection has been reached between the shaft ends under plastic deformation.

In accordance with one embodiment of the present invention, the central part of the central portion with a constant low polar resistance moment comprises at least 25% of the length of the shaft wherein said polar resistance moment of the central part of the central portion is 3–20% lower than said minimum polar resistance moment of the end portions.

In one particular embodiment, the outer diameter of the central portion, including that of the axial ends, is constant and the wall thickness and the diameter of the central part of the central portion are constant.

In another embodiment of the present invention, the regions of transition between the central portion and the end portions constitute steady changes in diameter and wall thickness in order to avoid load peaks of any kind.

In addition, the invention provides for the outer surface of the central portion and of the transition portions to be groove-free in order to ensure that the torsionally softest part is located in the region of the central portion and that no other weakening occurs in the region of the transition portions.

In a further embodiment, the shaft comprises a heat-treated material of uniform strength.

Furthermore, if the shaft of the present invention is used as a driveshaft in the driveline of a motor vehicle, which driveshaft is complemented by universal joints and convoluted boots, the convoluted boots, by means of their respective smaller collar portions, are positioned on the axial outer ends of the central portion without positively engaging same. In this way, it is possible to lengthen the torsionally soft part of the central portion as far as or even underneath the convoluted boots, as a result of which the fullest possible use is made of the scope of the invention.

BRIEF DESCRIPTION OF THE DRAWINGS

For a more complete understanding of the invention, reference should now be made to the embodiments illustrated in greater detail in the accompanying drawings and described below by way of examples of the invention. In the drawings:

FIG. 1 shows an inventive monobloc hollow shaft in a longitudinal section in correlation with an associated diagram of the course taken by the polar resistance moment $W_p$ along the shaft length (L).

FIG. 2 shows two side shafts in a longitudinal section, comprising a monobloc hollow shaft, two constant velocity universal joints connected to the latter and sealing convoluted boots: (a) in accordance with the invention; (b) according to the state of the art.

DETAILED DESCRIPTION OF A PREFERRED EMBODIMENT

Figure 3:
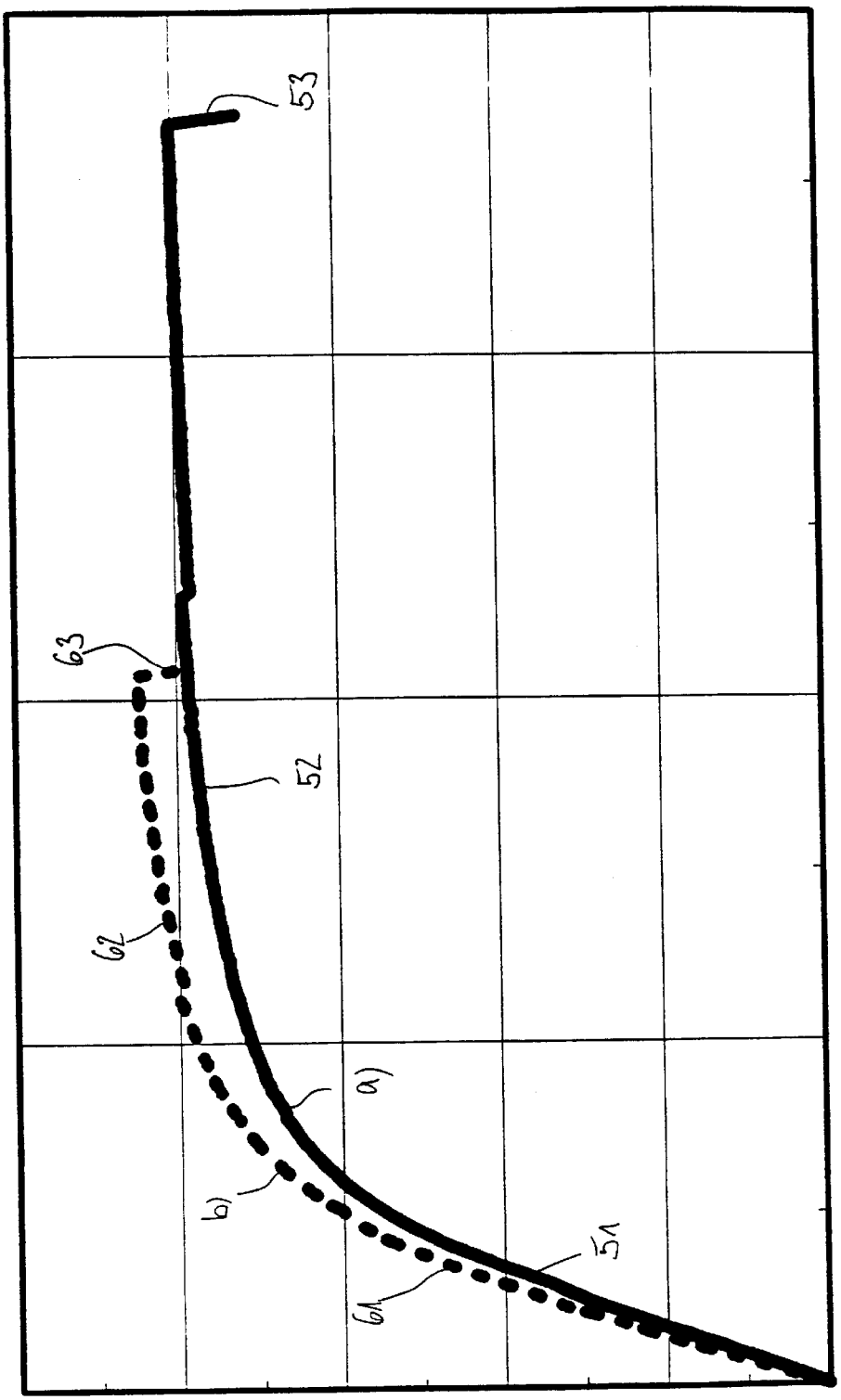
FIG. 3 shows a stress-strain diagram/fracture diagram showing the torque as a function of torsional deflection between the shaft ends: (a) for a shaft according to FIG. 2a; (b) for a shaft according to FIG. 2b.

FIG. 1 shows a monobloc hollow shaft 11 with a central portion 12, two end portions 13, 14 as well as two portions of transition 15, 16. The axial outer ends of the end portions 13, 14 are provided with outer shaft toothings 17, 18, with the ends of the shaft toothings 17, 18 comprising recesses 19, 20, 21, 22 for securing rings (not shown). The central portion 12, in its central part 12', comprises a constant minimum resistance moment which extends over approximately 40% of the total length of the shaft, as well as a uniformly thin wall thickness and a constant diameter. The adjoining end regions 12", 12''' of the central portion continue with the outer diameter of the central portion, whereas, while the wall thickness increases towards the axial ends, the inner diameter decreases. As compared to the central portion 12, the two end portions 13, 14 have a clearly greater wall thickness and a slightly small outer diameter which, again, is constant, with the exception of the shaft toothings 17, 18 and the recesses 19, 20, 21, 22. Approximately conical regions of transition 15, 16 with constant wall thickness connect the end portions 13, 14 to the central portion 12. The diagram shows quite clearly that the value of the resistance moment in part 12' of the central portion 12 is constantly low as compared to that of the two end portions 13, 14 and, in particular, is approximately 20% lower than the latter. Because of an increasing wall thickness, the outer parts 12", 12''' of the central portion feature an increased resistance moment. The regions of transition 15, 16 constitute a non-constant transition between the above-mentioned regions 12 and 13, 14 in respect of the resistance moment.

FIGS. 2a and 2b will initially be described jointly, and it can be seen that there are substantial differences between the embodiment of the monobloc hollow shaft 11 in accordance with the invention as compared to the monobloc hollow shaft 31 according to the state of the art. The central portion 12 of the inventive monobloc hollow shaft 11 is clearly longer and comprises a thinner wall thickness (FIG. 2a) than a central portion 32 of a prior art monobloc shaft 31 (FIG. 2b) with comparable lengths and comparable shaft toothings. Onto the respective ends of the monobloc shafts 11, 31 there are slid on constant velocity universal joints 23, 24, 43, 44. The constant velocity universal joints 23, 43 include attaching journals 29, 49, respectively. On the constant velocity universal joints 23, 24, 43, 44 towards their respective centers, there are placed metal caps 25, 26, 45, 46. Onto the latter, there are slid convoluted boots 27, 28, 47, 48 which, by means of their smaller collars, are positioned on the central portion (FIG. 2a) and, respectively, in the grooves 39, 40 in the end portions 33, 34 (FIG. 2b).

FIG. 3 shows a stress-strain diagram/fracture diagram showing the torque as a function of torsional deflections between the shaft ends for the shafts shown in FIGS. 2a and 2b, respectively. Referring to line (a) of FIG. 3 which corresponds to FIG. 2a, when the elastic (proportional) range 51 is exceeded, an elongated region 52 of plastic deformation occurs. The region 52 is characterized by considerable torsional deflections with only a slightly increasing torque until the fracture descent 53 occurs. On the other hand, referring to a conventional shaft as represented by line (b), the torque reaction is characterized by a slightly steeper proportional range 61 which, at a relatively slightly higher torque, is followed by range 62 of plastic deformation which, however, leads to the fracture descent 63 at a very early stage.

From the foregoing it can be seen that there has been brought to the art a new and improved monobloc hollow shaft. While the invention has been described in connection with one or more embodiments, it is not intended to be limited thereto. To the contrary, the invention covers all alternatives, modifications and equivalents which may be included within the spirit and scope of the appended claims.

What is claimed is:

1. A monobloc hollow shaft made from unitary elastically deformable material, said shaft for transmitting torque and comprising:

two end portions which, at axial outer ends thereof, comprise shaft toothings for introducing torque; and a central portion which, as compared to the end portions, has a smaller wall thickness and a greater outer diameter, wherein the polar resistance moment of a central part of the central portion of at least 25% of the length of the shaft is constant and is 3%–20% lower than the minimum polar resistance moment of the end portions of the shaft.

2. A hollow shaft according to claim 1 wherein the outer diameter of the central portion, including that of axial outer ends of the central portion, is constant.

3. A hollow shaft according to claim 1 wherein the wall thickness and the diameter of the central part of the central portion are constant along the length of same.

4. A hollow shaft according to claim 1 wherein between the central portion and the end portions a region of transition constitutes uniform changes in diameter and wall thickness.

5. A hollow shaft according to claim 1 wherein its outer surface is groove-free in the central portion and in the regions of transition.

6. A hollow shaft according to claim 1 wherein the shaft is a heat-treated material of uniform strength.

* * * * *